United States Patent [19]
Talbot et al.

[11] Patent Number: 5,513,287
[45] Date of Patent: Apr. 30, 1996

[54] PRISM COUPLING MOUNT

[75] Inventors: Pierre J. Talbot, Remsen; David R. Jennings, Lycoming, both of N.Y.

[73] Assignee: The United States of America as represented by the Secretary of the Air Force, Washington, D.C.

[21] Appl. No.: 296,780

[22] Filed: Aug. 26, 1994

[51] Int. Cl.[6] .................................................. G02B 6/34
[52] U.S. Cl. ................................................. 385/25; 385/36
[58] Field of Search ........................... 385/25, 26, 28, 385/36, 129, 29; 372/16, 100

[56] References Cited

U.S. PATENT DOCUMENTS

| | | | |
|---|---|---|---|
| 3,584,230 | 6/1971 | Tien | 385/36 X |
| 3,883,221 | 5/1975 | Rigrod | 385/36 |
| 4,637,684 | 1/1987 | Tomita et al. | 385/36 |
| 4,653,844 | 3/1987 | Ward | 385/36 |
| 4,923,743 | 6/1990 | Isobe et al. | 385/36 X |
| 5,028,118 | 7/1991 | Facq et al. | 385/28 |
| 5,031,984 | 7/1991 | Eide et al. | 350/96.15 |
| 5,094,518 | 3/1992 | Musk | 385/35 |
| 5,131,745 | 7/1992 | Whitney et al. | 356/153 |
| 5,271,076 | 12/1993 | Ames | 385/26 |

OTHER PUBLICATIONS

"Excitation of Hybrid Modes in Magnetooptic Waveguides", John Warner, Applied Optics/ May 1974/ vol. 13, No. 5, pp. 1001–1004.

*Primary Examiner*—Rodney B. Bovernick
*Assistant Examiner*—Hemang Sanghavi
*Attorney, Agent, or Firm*—Robert L. Nathans; Stanton E. Collier

[57] ABSTRACT

A prism coupling mount is provided for readily substituting various prisms and planar slab waveguides therein without damage to these components. For maximum coupling efficiency, the spacing between the coupling prism base and the waveguide can be adjusted, along with the mode selection angle and the prism surface incident tilt angle. A rotatable support stage supports the prism coupling mount and the center of rotation thereof is adjustable to ensure that it lies directly beneath the prism input surface.

23 Claims, 2 Drawing Sheets

PRISM COUPLING MOUNT

STATEMENT OF GOVERNMENT INTEREST

The invention described herein may be manufactured and used by or for the Government for governmental purposes without the payment of any royalties thereon.

BACKGROUND OF THE INVENTION

Most electro-optic devices utilize the convenient geometry of planar slab waveguides in their designs. Testing of these devices usually requires that a propagating laser beam be induced in the planar slab waveguide. A number of distinct types of propagating laser beams called modes can be directed by the waveguide. It is advantageous in testing to be able to selectively induce in the waveguide a particular mode of the propagating laser beam modes that the waveguide is capable of directing.

There exists three methods for coupling a free-space laser beam into a propagating laser beam in the slab waveguide. End-coupling requires that the edge of the waveguide be accessible, polished and adequately thick, and is not appropriate for inducing propagating laser beam modes in thin film planar slab waveguides. Also, alignment accuracy makes mode selection impractical.

Grating coupling entails the computation of complex grating structures which are etched onto the surface of the slab waveguide. A distinct grating structure must be computed and etched for each propagating laser beam mode that is required. Thus, grating coupling is a time consuming and complex process ill suited to applications involving experimental testing.

Prism coupling is the most experimentally flexible method for inducing a propagating laser beam mode in a slab waveguide. It is a surface coupling method suitable for thin film planar slab waveguides, and propagating laser beam mode selection is easily accomplished by varying the mode selection angle of the laser beam on the input surface of the prism. Also, prism coupling doesn't entail permanent damage to the surface of the waveguide as is required with the grating coupling method.

The efficiency with which prism coupling can induce a propagating laser beam mode in the slab waveguide is dependent upon the alignment of a number of prism coupling parameters. The following parameters should be adjustable: (1) the spacing between the coupling prism base and the waveguide, (2) the mode selection angle, and (3) the prism surface incident tilt angle. A zero tilt angle is optimum.

The practical utilization of the prism coupling method requires a convenient means of making these adjustments to the coupling parameters. The disadvantages of the method to date are its inflexibility, inconvenience and expense. Prism coupling requires fragile and expensive prisms of high refractive index. One of a kind housings for the prisms to effect the coupling are usually machined specifically for each experimental investigation. The prisms are generally glued into their housings committing them to that single experimental investigation and rendering them damaged and useless for subsequent use in other experimental investigations. In addition, a single experimental investigation may require coupling utilizing a range of prism sizes and shapes which is very inconvenient with present one of a kind machined housings that require selection of a particular prism size and shape.

BRIEF SUMMARY OF THE INVENTION

The prism coupling mount of the present invention is a research tool designed to allow the flexible and convenient utilization of the prism coupling method. The mount permits free space laser beams to be optimally coupled into any desired propagating laser beam mode of a slab waveguide. The mount provides flexible mounting of sample slab waveguides and the expensive coupling prisms. Furthermore, the system reduces damage to the coupling prisms and allows for the convenient interchange of different prism sizes and shapes while also permitting the convenient adjustment of the aforesaid prism coupling parameters that determine the optimal performance of the prism coupling method. In addition the coupling mount is capable of output coupling of all propagating laser beam modes in the slab waveguide into spatially distinct free space beams which is accomplished through the use of a second optional prism.

BRIEF DESCRIPTION OF THE DRAWINGS

Other features of the invention will become apparent upon study of the following description, taken in conjunction with the drawings in which.

DETAILED DESCRIPTION

Figure 1:
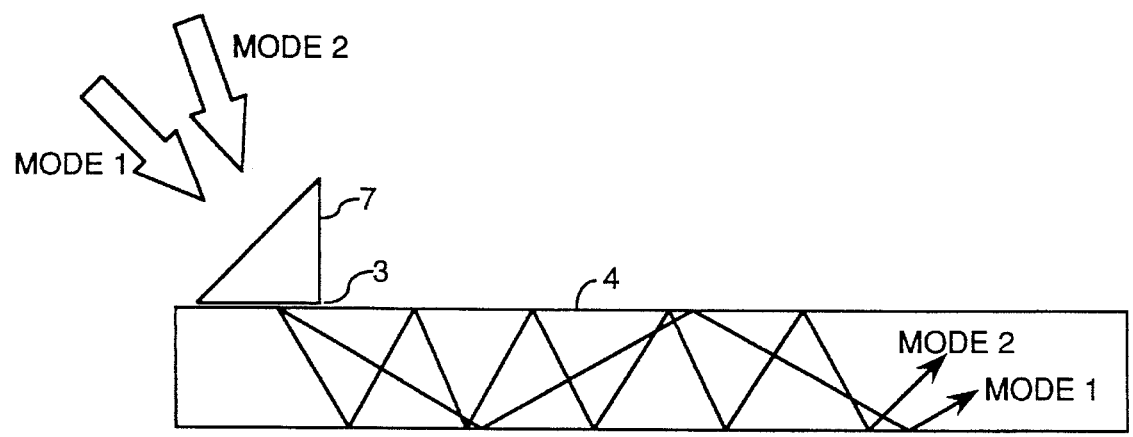
FIGS. 1 and 2 illustrate two distinct beam modes entering and leaving the planar slab waveguide respectively.
Figure 2:
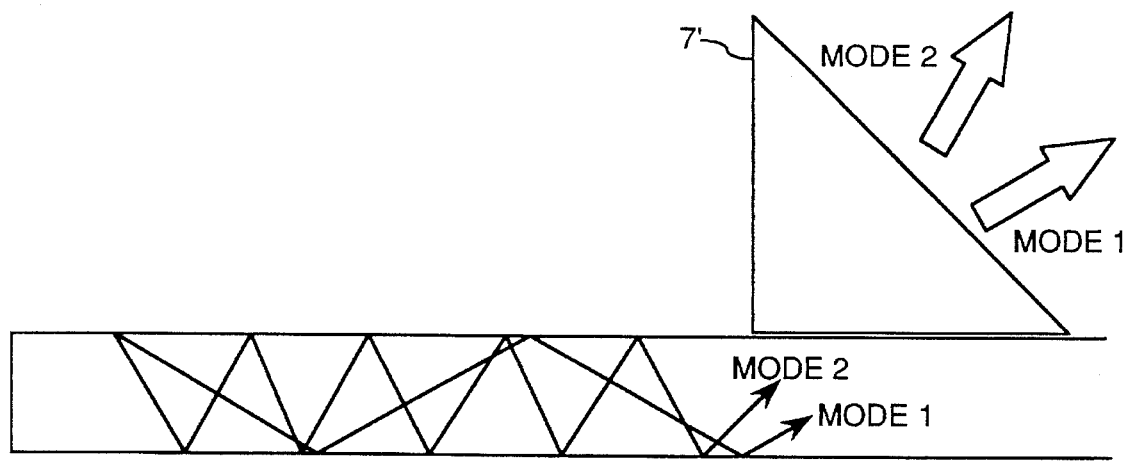

In FIG. 1, input prism 7 is positioned over planar slab waveguide 4, and is slightly separated from the waveguide by space 3 which contains a conventional coupling fluid. Modes 1 and 2 of the propagating laser beam are illustrated within waveguide 4 and each distinct mode can be induced within the waveguide by changing the prism surface angle of incidence as shown. An optional output prism 7' can be provided for spatially separating the modes exiting the waveguide as shown in FIG. 2.

Figure 5:
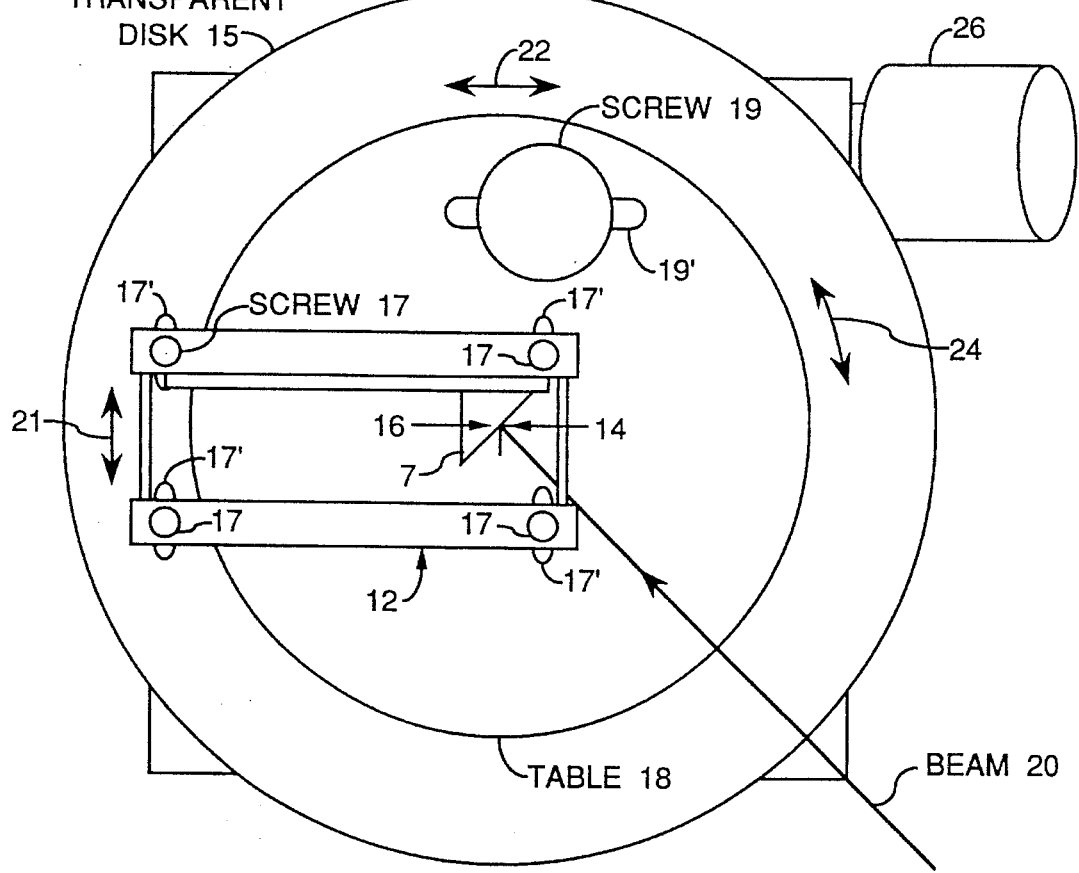
FIG. 5 illustrates various devices for altering the prism coupling parameters.

In FIG. 5, laser beam 20 is directed at the prism surface edge 16 of prism 7, which contacts planar slab waveguide 4. The aforesaid modes illustrated in FIG. 1 and 2 are created by changing the angle of incidence of laser beam 20 with respect to the prism face 16.

Figure 3:
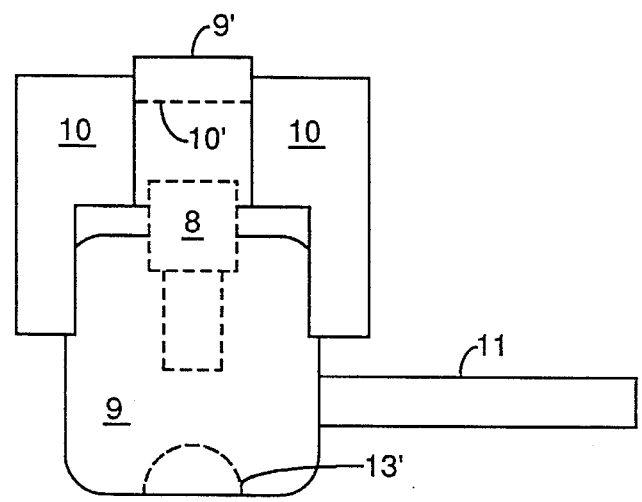
FIG. 3 illustrates the prism chuck mount positioned between the prism 7 and prism positioning screw 13 of FIG. 4 which illustrates the prism coupling mount.
Figure 4:
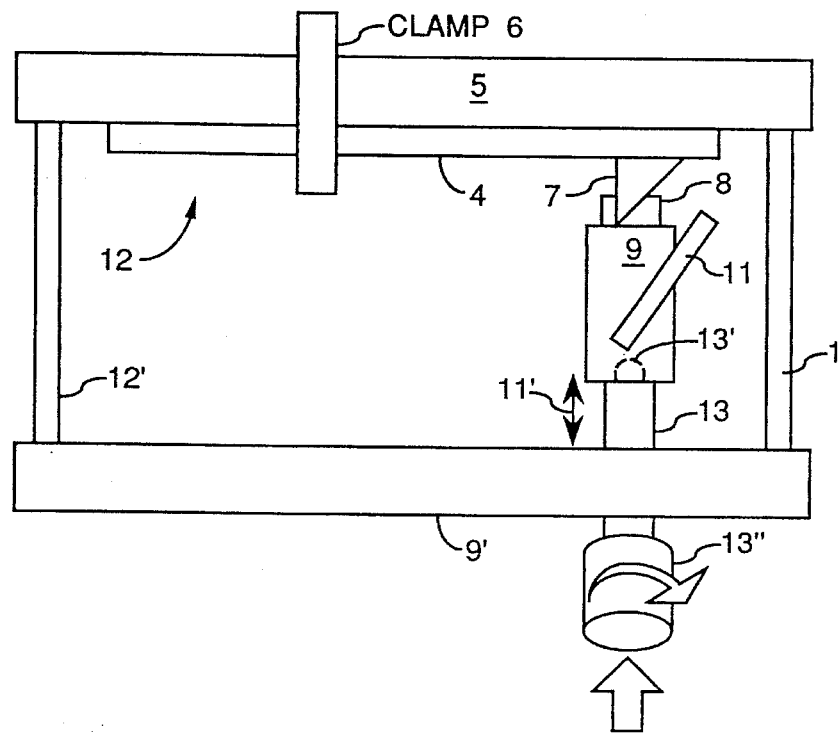

Prism coupling mount 12, is mounted upon a transparent disk 15, and is shown in greater detail in FIG. 4, wherein waveguide clamp 6 clamps the upper surface of waveguide 4 against the lower surface of waveguide mounting wall 5. Side wall members 12' are coupled between waveguide mounting wall 5 and prism positioning wall 9'. Prism chuck mount housing 9 has a prism chuck 8 therein and a handle 11 as shown in FIGS. 3 and 4. Chuck mount forceps members 10 can be coupled together as schematically indicated by 10' and squeeze the sides of the prism 9' to retain a prism within chuck 8. This unit is coupled between prism 7 and prism positioning screw 13 as shown in FIG. 4 but is not shown in FIG. 5 to avoid cluttering up the drawing. The prism positioning screw and chuck thus constitute the spacing adjustment means for adjusting the spacing between the coupling prism and the waveguide.

Prism coupling mount 12 has four position adjustment screws 17 shown in FIG. 5 that can be loosened to translate the entire prism coupling mount 12 relative to transparent disk 15 as indicated by double-headed arrow 21. The screws pass through slots 17' to permit this adjustment, after which they are tightened to firmly couple the prism mount 12 to the transparent disk 15, which in turn is coupled to the smaller rotatable table 18, via disk screw 19. The rotatable table 18 is positioned under the larger overlying transparent disk 15 and both of these members constitute rotation means for rotating the coupling prism in a first direction to enable the aforesaid mode selection. When loosened, disk screw 19, which rides in slot 19', permits translation of transparent disk 15 relative to the underlying rotatable table 18 as indicated by double-headed arrow 22. The purpose of these two position adjustment devices is to ensure that the center of rotation of the rotation stage or disk 15 (the prism mount support means) lies directly beneath the light beam input surface 16 of the coupling prism. The two directions of translation of the prism mount are at ninety degrees with respect to each other as indicated by these double-headed arrows 21 and 22. Table 18, underlying transparent disk 15, can be manually rotated by turning a rotation drive knob 26, as indicated by double-headed arrow 24, to conveniently change the angle of incidence of laser beam 20 with respect to prism 7, to in turn select the desired mode as described above. Rotatable table 18 can carry a fiducial scale indicating its angular position for this purpose.

The prism chuck mount housing 9 of FIG. 4 is manually positioned by means of handle 11, and a terminal ball member of positioning screw 13 is fitted within a mating hemispherical cavity 13'. Screw 13 is rotated via knob 13" to press the prism against the lower surface of waveguide 4. Prism coupling is now fine tuned by adjusting the prism base-to-waveguide distance by manually rotating the chuck mount positioning screw 13. This is indicated by double-headed arrow 11'. The prism surface is slightly separated from the waveguide surface by a suitable coupling fluid layer. The aforesaid tilt angle of the beam 20 relative to a normal line intersecting the prism surface, is minimized by rotating the prism relative to the waveguide using the prism chuck mount extension handle 11, with the positioning screw 13 untightened. This is indicated by double-headed arrow 30. Note that this tilt adjustment rotation in a second direction is orthogonal with respect to the first direction of prism rotation for performing the mode selection step.

Prism chuck mount housing 9 is easily removed by unscrewing the chuck mount positioning screw 13, and another chuck mount housing 9 holding another prism may be readily positioned within the prism coupling mount 12. Thus, various prisms may be experimented with without damaging them to render them useless for subsequent experimental investigations, since the prisms are not glued to the waveguides. Also, note that the system provides for convenient adjustment of the aforesaid coupling parameters which maximize coupling efficiency including the mode selection angle, the prism tilt angle and the spacing between the prism base and the waveguide. Should the aforesaid optional output prism 7', shown in FIG. 2 be used, a second unit, including members 7, 9, and 13, can be additionally positioned in the left hand portion of the prism coupling mount 12, to position the output prism against the left hand portion of the waveguide.

Since other embodiments of the invention will become apparent to skilled workers in the art, the scope of the invention is to be restricted solely by the terms of the following claims and art recognized equivalents.

We claim:

1. In combination:
   (a) a prism coupling mount for maintaining a coupling prism closely adjacent a waveguide for inducing a propagating light wave therein;
   (b) spacing adjustment means for changing the spacing between said waveguide and said coupling prism;
   (c) rotation means for rotating said coupling prism in a first direction for altering the mode selection angle between a light beam input surface of the coupling prism and an input light beam directed at the light beam input surface of said coupling prism; and
   (d) means for rotating said coupling prism in a second direction for changing the tilt angle between said input light beam and the light beam input surface of said coupling prism.

2. The combination as set forth in claim 1 wherein said spacing adjustment means includes a rotatable screw.

3. The combination as set forth in claim 1 wherein said rotation means includes a rotatable prism mount support means for supporting said prism coupling mount and having a given center of rotation.

4. The combination as set forth in claim 1 further including prism coupling mount position adjustment means for ensuring that the center of rotation of the rotatable prism coupling mount support means lies directly beneath the light beam input surface of said coupling prism.

5. The combination as set forth in claim 1 including a coupling prism chuck for detachably holding said coupling prism.

6. The combination as set forth in claim 5 further including means for detachably mounting said waveguide upon said prism coupling mount.

7. The combination as set forth in claim 1 including translation adjustment means for permitting said prism coupling mount to be translated in two orthogonal directions.

8. The combination as set forth in claim 1 including a layer of coupling fluid positioned between said waveguide and said coupling prism.

9. The combination as set forth in claim 1 further including means for detachably mounting said waveguide upon said prism coupling mount.

10. The combination as set forth in claim 1 including a coupling prism chuck for detachably holding said coupling prism.

11. The combination of claim 1 further including a second prism optically coupled to said waveguide for output coupling propagating laser beam modes in said waveguide into spatially distinct free space beams.

12. In combination:
   (a) a prism coupling mount for maintaining a coupling prism closely adjacent a waveguide for inducing a propagating light wave therein;
   (b) spacing adjustment means for changing the spacing between said waveguide and said coupling prism;
   (c) rotation means for rotating said coupling prism in a first direction for altering the mode selection angle between a light beam input surface of the coupling prism and an input light beam directed at the light beam input surface of said coupling prism;
   (d) said rotation means including a rotatable prism mount support means for supporting said prism coupling mount and having a given center of rotation; and
   (e) prism coupling mount position adjustment means for ensuring that the center of rotation of the rotatable prism coupling mount support means lies directly beneath the light beam input surface of said coupling prism.

13. The combination as set forth in claim 12 including means for rotating said coupling prism in a second direction for changing the tilt angle between said input light beam and the light beam input surface of said coupling prism.

14. The combination as set forth in claim 12 further including prism coupling mount position adjustment means for ensuring that the center of rotation of the prism coupling mount support means lies directly beneath the light beam input surface of said coupling prism.

15. The combination as set forth in claim 12 including a coupling prism chuck for detachably holding said coupling prism.

16. The combination as set forth in claim 12 further including means for detachably mounting a waveguide upon said prism coupling mount.

17. The combination as set forth in claim 12 including translation adjustment means for permitting said prism coupling mount to be translated in two orthogonal directions.

18. The combination as set forth in claim 12 further including means for detachably mounting a waveguide upon said prism coupling mount.

19. The combination as set forth in claim 12 including a layer of coupling fluid positioned between said waveguide and said coupling prism.

20. The combination as set forth in claim 12 including a coupling prism chuck for detachably holding said coupling prism.

21. The combination of claim 12 further including a second prism optically coupled to said waveguide for output coupling propagating laser beam modes in said waveguide into spatially distinct free space beams.

22. In combination:
 (a) a prism coupling mount for maintaining a coupling prism closely adjacent a waveguide for inducing a propagating light wave therein, said prism coupling mount including a coupling prism chuck for detachably holding said coupling prism and further including means for detachably mounting said waveguide upon said prism coupling mount;
 (b) spacing adjustment means including a rotatable screw for changing the spacing between said waveguide and said coupling prism;
 (c) rotation means for rotating said coupling prism in a first direction for altering the mode selection angle between a light beam input surface of the coupling prism and an input light beam directed at the light beam input surface of said coupling prism;
 (d) said rotation means including a rotatable prism mount support means for supporting said prism coupling mount and having a given center of rotation;
 (e) prism coupling mount position adjustment means for ensuring that the center of rotation of the rotatable prism coupling mount support means lies directly beneath the light beam input surface of said coupling prism; and
 (f) means for rotating said coupling prism in a second direction for changing the tilt angle between said input light beam and the light beam input surface of said coupling prism.

23. The combination of claim 22 further including a second prism optically coupled to said waveguide for output coupling propagating laser beam modes in said waveguide into spatially distinct free space beams.

\* \* \* \* \*